May 30, 1944.   C. D. BARBER ET AL   2,350,143
SUGAR REFINING PROCESS
Filed Jan. 11, 1941
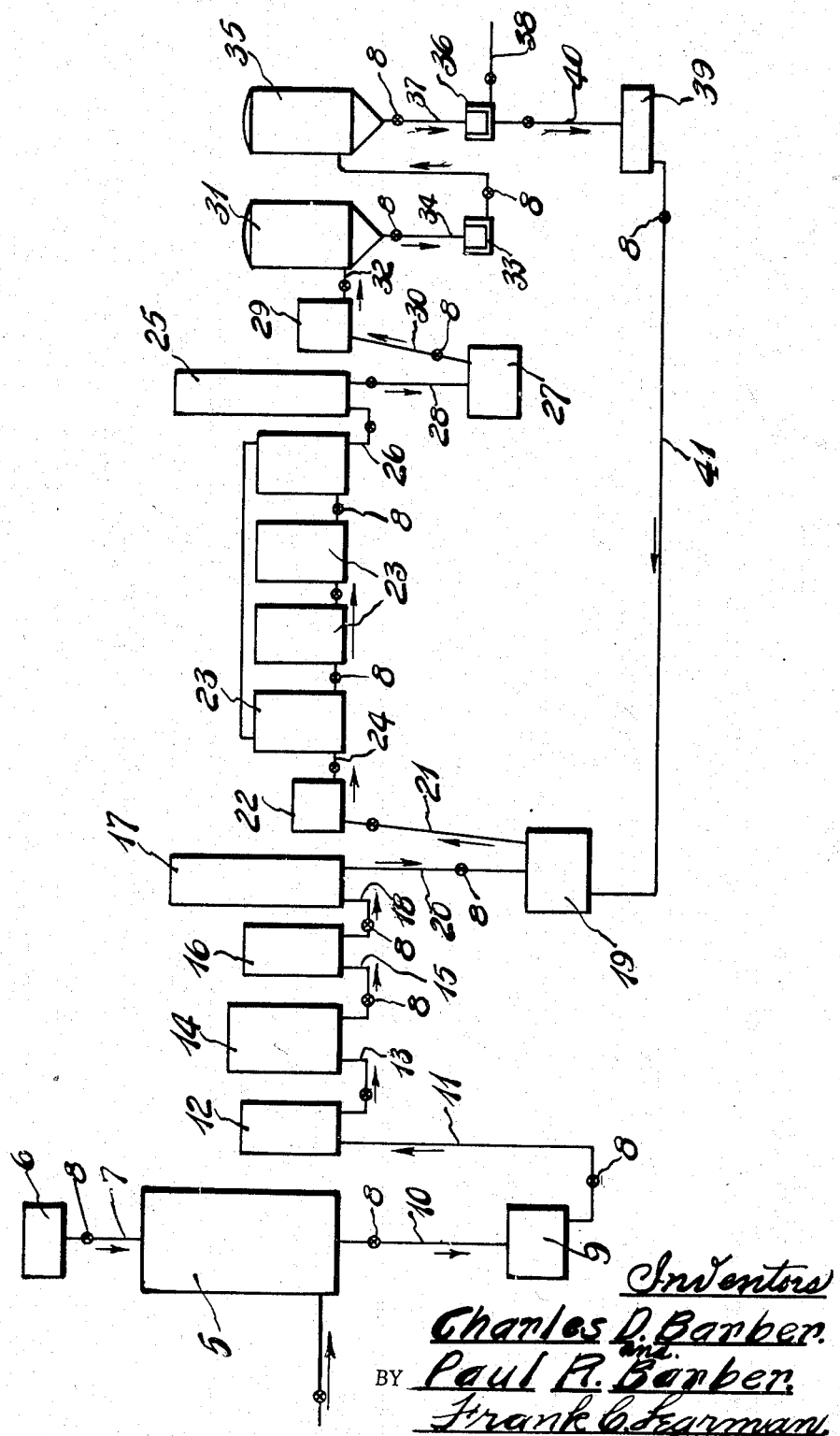
Inventors
Charles D. Barber.
and
BY Paul R. Barber.
Frank C. Fearman.
Attorney.

Patented May 30, 1944

2,350,143

UNITED STATES PATENT OFFICE 2,350,143

SUGAR REFINING PROCESS

Charles D. Barber and Paul R. Barber, Green Bay, Wis.

Application January 11, 1941, Serial No. 374,028

1 Claim. (Cl. 127—50)

This invention relates to new and useful improvements in a process of manufacturing sugar in which tri-sodium phosphate is employed in a step of chemical purification of the raw, unrefined juices after the juice has been limed, and calcium chloride added after the juice has been sulphited.

One of the prime objects of the invention is to reduce the lime salts, organic matter, and sulphur in the juice as it is being processed, thereby increasing the sugar yield, and securing a clear white sugar with low ash content.

It is commonly known among sugar experts and chemists that lime salts in the juice retards evaporization and crystallization, and that the presence of organic matter causes dark colored juices and off-colored sugar; also that sulphur causes a high ash in sugar and is detrimental in the final molasses when further treated for the manufacture of by-products; and we have, therefore, provided a process of manufacture by means of which these objectionable substances are almost entirely eliminated, resulting in lighter colored juices, a higher yield of clear white sugar with a low ash content, and a final molasses with a low sulphur content, which is of considerable value in the manufacture of by-products.

Our process also results in additional advantages in that there is less scale formation on the evaporator tubes, piping, and valves, and less gums in the low grade sugar pans. The capacity of the apparatus employed in the process is increased and there is less replacement of tubes, valves, and similar equipment.

In the accompanying drawing we have shown a flow sheet of the sugar process illustrating the method of treatment of the raw juices, the arrows indicating the direction of flow.

Beginning at the point in the process where the raw juices from the diffusion battery (not shown) enter the first carbonation unit indicated at 5, and where it is limed from a tank 6 located directly adjacent said unit and communicating therewith by a pipe line 7, which pipe line is controlled by a valve 8 in the usual manner. A juice receiving tank 9 is located adjacent the carbonation unit 5 and is connected thereto by means of a pipe line 10, and tri-sodium phosphate is added to this tank 9 to lower the lime salts present in the juices and facilitate the evaporization and crystallization, another conventional valve 8 being provided in the pipe line 10 to control the admission of juice to the tank 9. The valves 8 are all of the same general design and are interposed in the pipe lines which connect the various units and steps in the process for controlling the flow of juices from one unit or tank to the other.

A pipe line 11 leads from the tank 9 to the filter presses 12, and thence a pipe 13 communicates with the second carbonation unit 14 where the juice is subjected to second carbonation, a line 15 leading to filters 16 where the juice is again filtered, thence flowing to the sulphur tower 17 through the pipe line 18.

A receiving tank 19 is connected to the sulphur tower 17 by means of the pipe line 20, and calcium chloride is added to the juice at this point to remove the ash resulting from the sulphur treatment. After the calcium chloride has been added, the juice flows through line 21 to the thin juice filters 22, thence to the evaporators 23 through the line 24, after which the juice enters the thick juice sulphur tower 25 through the line 26 and the thick juice is again sulphited.

A receiving tank 27 is provided adjacent the sulphur tower 25 and a pipe line 28 establishes communication therebetween, and here again calcium chloride is added to the juice to remove the ash, and the juice then flows to the thick juice filter 29 through the pipe line 30; thence the juice flows to what is known as the white vacuum pan 31, through the pipe line 32.

The mixture, consisting of a large percentage of crystals and mother liquor, commonly known as white massecuite, is then conducted to the centrifugals 33 through the line 34 where the white sugar is extracted as a finished product from the high green syrup, and thence flows to granulators and bins (not shown).

The high green syrup is further concentrated by consecutive treatments in a vacuum pan 35, then entering the brown sugar centrifugals 36 through pipe 37. The discard molasses used in the manufacture of by-products is discharged through the line 38 and the brown sugar from the centrifugals enters the brown sugar melter 39 through line 40, where it is remelted and dissolved by the addition of a suitable solvent; then the brown sugar syrup flows through the pipe 41 to the receiving tank 19 where it again enters the process following the same route through the refining process as do the raw juices with which it is mixed.

The process eliminates most of the lime salts which effect the boiling of the liquors as well as decreasing the tendency to deposit scale on the evaporator tubes, etc.; it also eliminates most of the ash, and further removes organic non-sugars present in raw sugar in concentrated form.

It is to be understood that the term "raw juices" as used in the instant description and in the appended claim includes those derived in the refining process of beets and sugar cane as well as those obtained in the "Steffens" process where the sugar is recovered from the molasses in the form of saccharate.

What we claim is:

The process of producing sugar of low ash content which consists in liming and subjecting the raw juice to a first carbonation treatment and a sulphitation treatment, then adding calcium chloride to the juice, then filtering, evaporating and subjecting the juice to another sulphitation treatment to remove the sulphur, again adding calcium chloride, concentrating the juice to produce a sugar of low ash content and a brown sugar syrup, and then re-entering the brown sugar syrup into the process at the point where the calcium chloride is first added.

CHARLES D. BARBER.
PAUL R. BARBER.